US012758984B2

(12) United States Patent
Urakawa et al.

(10) Patent No.: US 12,758,984 B2
(45) Date of Patent: Oct. 13, 2026

(54) CHANNEL CHIP AND DIELECTROPHORESIS DEVICE

(71) Applicant: SCREEN HOLDINGS CO., LTD., Kyoto (JP)

(72) Inventors: Satoshi Urakawa, Kyoto (JP); Masakazu Sanada, Kyoto (JP); Kyoichi Oshiro, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 342 days.

(21) Appl. No.: 18/575,193

(22) PCT Filed: Jun. 29, 2022

(86) PCT No.: PCT/JP2022/026048
§ 371 (c)(1),
(2) Date: Dec. 28, 2023

(87) PCT Pub. No.: WO2023/277088
PCT Pub. Date: Jan. 5, 2023

(65) Prior Publication Data

US 2026/0115737 A1 Apr. 30, 2026

(30) Foreign Application Priority Data

Jun. 30, 2021 (JP) ................................ 2021-108280

(51) Int. Cl.
*B03C 5/00* (2006.01)

(52) U.S. Cl.
CPC .................................... *B03C 5/005* (2013.01)

(58) Field of Classification Search
CPC ......... B03C 5/005; B03C 5/026; B03C 5/028; G01N 27/327-3272; G01N 27/44791
See application file for complete search history.

(56) References Cited

U.S. PATENT DOCUMENTS 3,725,236 A 4/1973 Johnson
2004/0011650 A1* 1/2004 Zenhausern ........... B82Y 15/00 204/547

(Continued)

FOREIGN PATENT DOCUMENTS

CN 102150037 A 8/2011
CN 112703057 A 4/2021

(Continued)

OTHER PUBLICATIONS

Emaminejad et al. Lab Chip, 2014, 14, 2105 (Year: 2014).*

(Continued)

*Primary Examiner* — Alexander S Noguerola
(74) *Attorney, Agent, or Firm* — Rimon P.C.

(57) ABSTRACT

A technique capable of evaluating the performance of electrodes for a channel for dielectrophoresis without using the channel is provided. A channel chip includes a substrate, a main channel, a liquid reservoir, a pair of main electrodes, and a pair of inspection electrodes. The main channel is disposed on an upper surface of the substrate and capable of receiving a liquid therein. The liquid reservoir is disposed on the upper surface of the substrate in spaced apart relation to the main channel. The liquid reservoir is capable of receiving a liquid therein. The pair of main electrodes are disposed between the upper surface of the substrate and the main channel. The pair of inspection electrodes are disposed between the upper surface of the substrate and the liquid reservoir.

9 Claims, 4 Drawing Sheets

(56) References Cited

U.S. PATENT DOCUMENTS

| | | | | |
|---|---|---|---|---|
| 2004/0053290 | A1* | 3/2004 | Terbrueggen | G01N 35/00871 205/777.5 |
| 2004/0118688 | A1* | 6/2004 | Dumas | G01N 27/44721 204/600 |
| 2006/0177815 | A1 | 8/2006 | Soh et al. | |
| 2011/0227558 | A1 | 9/2011 | Mannion et al. | |
| 2016/0130639 | A1* | 5/2016 | Pennathur | G01N 33/48707 204/601 |
| 2016/0299138 | A1* | 10/2016 | Almasri | G01N 27/02 |
| 2019/0032103 | A1* | 1/2019 | Wakizaka | G01N 27/447 |
| 2019/0084011 | A1* | 3/2019 | Imai | G01N 15/1484 |
| 2020/0016608 | A1 | 1/2020 | Iizuka et al. | |

FOREIGN PATENT DOCUMENTS

| | | | |
|---|---|---|---|
| JP | 2006-351246 | A | 12/2006 |
| JP | 2007-057293 | A | 3/2007 |
| JP | 2017-134020 | A | 8/2017 |
| JP | 2020-008495 | A | 1/2020 |
| JP | 2020-514710 | A | 5/2020 |
| WO | 2007/046484 | A1 | 4/2007 |
| WO | 2018/118893 | A1 | 6/2018 |

OTHER PUBLICATIONS

International Search Report received in International Application No. PCT/JP2022/026048 dated Sep. 13, 2022.

Second Notice of Reasons for Refusal dated Jan. 21, 2025, from corresponding Japanese Patent Application No. 2021-108280, 10 pages.

Extended European Search Report dated Jun. 2, 2025, from corresponding European Patent Application No. 22833234.2, 17 pages.

Office Action dated Sep. 10, 2024, from corresponding Japanese Patent Application No. JP 2021-108280, 10 pages.

Office Action dated May 30, 2026, from corresponding Chinese Patent Application No. 202280046916.3, 8 pages.

* cited by examiner

CHANNEL CHIP AND DIELECTROPHORESIS DEVICE

CROSS-REFERENCE TO RELATED APPLICATIONS

This application is the U.S. National Phase under 35 U.S.C. § 371 of International Application No. PCT/JP2022/026048, filed on Jun. 29, 2022, which claims the benefit of foreign priority to JP Patent Application No. 2021-108280 filed on Jun. 30, 2021, the entire contents of each of which are hereby incorporated by reference.

TECHNICAL FIELD

The present invention relates to a channel chip and a dielectrophoresis device.

BACKGROUND ART

Channel chips that use a dielectrophoretic force to separate and collect objects to be collected have been known in the past. This type of channel chip includes a channel (microchannel) into which a liquid containing the objects to be collected is injected, and electrodes (microelectrode) for electrically capturing the objects in the liquid. Such a channel chip is disclosed, for example, in Patent Literature 1.

CITATION LIST

Patent Literature

Patent Literature 1: Japanese Patent Application Laid-Open No. 2017-134020

SUMMARY OF INVENTION

Technical Problem

Variations can occur in the thickness and relative dielectric constant of an insulating protective film for protecting in-plane electrodes and in the resistivity of electrode metal due to the manufacturing steps of the channel chip. If surface organic contamination occurs in the course of manufacture, organic residue thereof can also affect the dielectrophoretic force. There is a likelihood that these cause a reduction in dielectrophoretic force to such a degree that the objects to be collected cannot be captured or cause an excessive force to such a degree that the objects to be collected are damaged.

For advance evaluation of the performance of the electrodes, it is also contemplated to inspect the electrodes for performance, with the liquid injected into the channel. However, the injection of the liquid into the channel might cause new surface contamination or cause clogging of the channel due to the presence of particles.

It is an object of the present invention to provide a technique capable of evaluating the performance of electrodes for a channel for dielectrophoresis without using the channel.

Solution to Problem

To solve the aforementioned problem, a first aspect is intended for a channel chip comprising: a substrate; a main channel disposed on one main surface of the substrate and capable of receiving a liquid therein; a liquid reservoir disposed on the main surface of the substrate in spaced apart relation to the main channel and capable of receiving a liquid therein; a pair of main electrodes disposed between the main surface of the substrate and the main channel; and at least one pair of inspection electrodes disposed between the main surface of the substrate and the liquid reservoir.

A second aspect is intended for the channel chip of the first aspect, wherein the liquid reservoir includes an inspection channel capable of passing a liquid therethrough, and wherein the pair of inspection electrodes are disposed between the main surface of the substrate and the inspection channel.

A third aspect is intended for the channel chip of the first or second aspect, wherein a first overlapping portion of the pair of main electrodes which overlaps the main channel is equal in area to a second overlapping portion of the pair of inspection electrodes which overlaps the liquid reservoir.

A fourth aspect is intended for the channel chip of any one of the first to third aspects, wherein the at least one pair of inspection electrode includes not less than two pairs of inspection electrodes.

A fifth aspect is intended for the channel chip of the fourth aspect, wherein the at least one pair of inspection electrodes include three pairs of inspection electrodes.

A sixth aspect is intended for the channel chip of any one of the first to fifth aspects, wherein the pair of main electrodes and the pair of inspection electrodes are disposed adjacent to each other.

A seventh aspect is intended for the channel chip of any one of the first to sixth aspects, wherein the pair of main electrodes and the pair of inspection electrodes have respective surfaces covered with an insulating protective film, and wherein the main channel and the liquid reservoir are disposed on the insulating protective film.

An eighth aspect is intended for the channel chip of any one of the first to seventh aspects, wherein the pair of main electrodes and the pair of inspection electrodes have a comb tooth shape.

A ninth aspect is intended for a dielectrophoresis device comprising: a channel chip as recited in any one of the first to eighth aspects; and a power supply part for applying a voltage to the pair of main electrodes and the pair of inspection electrodes.

Advantageous Effects of Invention

According to the channel chip of the first aspect, the pair of main electrodes corresponding to the main channel and the pair of inspection electrodes corresponding to the liquid reservoir are disposed on the same substrate. Thus, with the liquid injected in the liquid reservoir, the pair of inspection electrodes are inspected for performance, whereby the performance of the pair of main electrodes is appropriately evaluated without using the main channel and the pair of main electrodes.

According to the channel chip of the second aspect, the pair of inspection electrodes overlap the inspection channel of the liquid reservoir, whereby the conditions of the environment in which the pair of inspection electrodes are disposed are brought closer to the conditions of the environment in which the pair of main electrodes are disposed. Thus, the performance of the pair of main electrodes is appropriately evaluated based on the inspection results of the pair of inspection electrodes.

According to the channel chip of the third aspect, the performance of the pair of inspection electrodes is the same as that of the pair of main electrodes because the area of the second overlapping portion of the pair of inspection electrodes is equal to that of the first overlapping portion of the pair of main electrodes. Thus, the performance of the pair of main electrodes is appropriately evaluated based on the inspection results of the pair of inspection electrodes.

According to the channel chip of the fourth aspect, even if in-plane variations occur in the manufacturing steps within the same channel chip, the performance of the pair of main electrodes is appropriately evaluated by averaging the measurement results of the plurality of pairs of inspection electrodes.

According to the channel chip of the fifth aspect, the provision of the three pairs of inspection electrodes ensures the minimum number of samples required to obtain an average error and suppresses an increase in size of the channel chip.

According to the channel chip of the sixth aspect, the pair of main electrodes and the pair of inspection electrodes are disposed adjacent to each other, so that the conditions of the environment in which the pair of inspection electrodes are disposed are brought closer to the conditions of the environment in which the pair of main electrodes are disposed. Thus, the performance of the pair of main electrodes is appropriately evaluated based on the inspection results of the pair of inspection electrodes.

According to the channel chip of the seventh aspect, the pair of main electrodes and the pair of inspection electrodes are protected by the insulating protective film.

According to the channel chip of the eighth aspect, the pair of main electrodes and the inspection electrodes are in a shortened and parallel comb tooth shape, whereby the low-resistance and uniform dielectrophoretic force is applied into the liquid.

DESCRIPTION OF EMBODIMENTS

Figure 1:
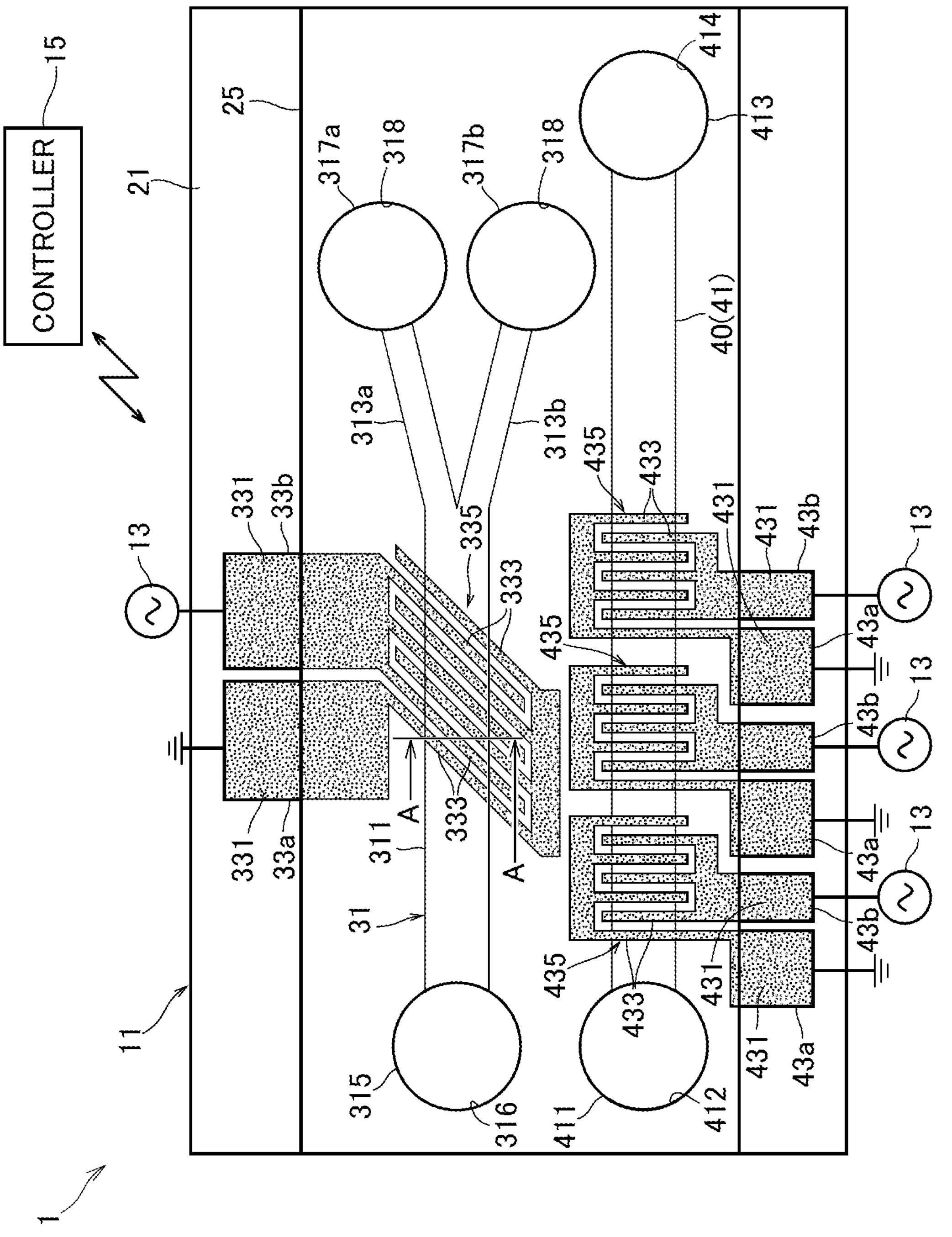
FIG. 1 is a plan view showing a dielectrophoresis device according to a first embodiment.

Embodiments according to the present invention will now be described with reference to the accompanying drawings. Components described in the embodiments are merely illustrative, and there is no intention to limit the scope of the present invention only thereto. In the drawings, the dimensions of components and the number of components are shown in exaggeration or in simplified form, as appropriate, for the sake of easier understanding in some cases.

1. First Embodiment

Figure 2:
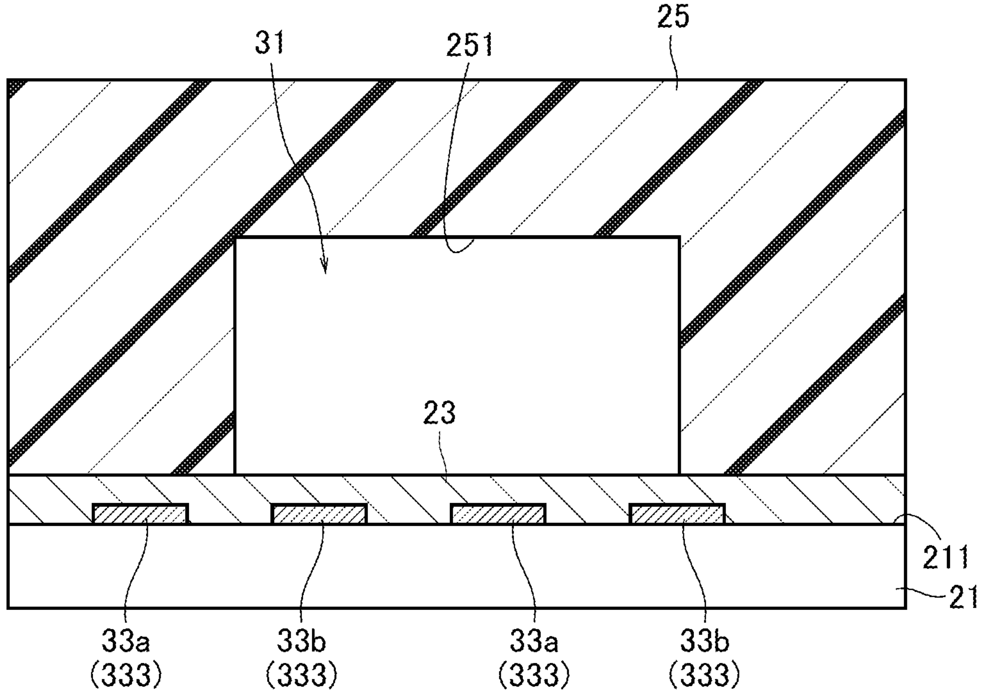
FIG. 2 is a schematic sectional view of a channel chip taken along a line A-A shown in FIG. 1.

FIG. 1 is a plan view showing a dielectrophoresis device 1 according to a first embodiment. FIG. 2 is a schematic sectional view of a channel chip 11 taken along a line A-A shown in FIG. 1. As shown in FIG. 1, the dielectrophoresis device 1 includes the channel chip 11, a plurality of power supply parts 13, and a controller 15.

The channel chip 11 is a device for electrically separating and collecting objects to be collected that are contained in a liquid of a specimen. Conceivable examples of the liquid of the specimen include body fluids such as blood, and physiological saline solution. The objects to be collected are substances present in liquids, and conceivable specific examples thereof include microorganisms, cells, proteins, and nucleic acids. The power supply parts 13 apply voltage to respective electrodes disposed in the channel chip 11. The controller 15 controls the voltage applied by the power supply parts 13. The controller 15 is configured with a computer having a general-purpose processor such as a CPU, a RAM, and the like. The controller 15 may include a purpose-built circuit (such as an application specific integrated circuit (ASIC)).

<Channel Chip>

As shown in FIG. 1, the channel chip 11 includes a substrate 21, a main channel 31, a pair of main electrodes 33*a* and 33*b*, a liquid reservoir 40, and a plurality of pairs (in this embodiment, three pairs) of inspection electrodes 43*a* and 43*b*.

The substrate 21 is made of quartz glass, for example. However, the material of the substrate 21 is not limited to quartz glass, and may be selected as appropriate. The substrate 21 has a substantially rectangular planar shape. However, the shape of the substrate 21 is not limited to the substantially rectangular planar shape.

The main channel 31 is capable of receiving therein a liquid containing the objects to be collected. As shown in FIG. 1, the main channel 31 includes a separation channel 311 and a pair of collection channels 313*a* and 313*b*. The separation channel 311 is an elongated channel extending linearly. The separation channel 311 has a first end connected to a first supply part 315. The first supply part 315 has a first supply opening 316 for injecting therethrough a liquid to flow into the separation channel 311. At a second end of the separation channel 311, the main channel 31 branches into the collection channel 313*a* and the collection channel 313*b*.

The collection channel 313*a* is a channel for collecting the objects to be collected that flow through the separation channel 311. The collection channel 313*b* is a channel for collecting objects not to be collected that flow through the separation channel 311. Each of the collection channels 313*a* and 313*b* has a first end connected to the second end of the separation channel 311. The collection channel 313*a* has a second end connected to a first collection part 317*a*. The collection channel 313*b* has a second end connected a first collection part 317*b*. The first collection part 317*a* has a first collection opening 318 for collecting the liquid flowing through the collection channel 313*a*. The first collection part 317*b* has a first collection opening 318 for collecting the liquid flowing through the collection channel 313*b*.

As shown in FIG. 2, the main electrodes 33*a* and 33*b* are disposed on an upper surface 211 of the substrate 21. The main electrodes 33*a* and 33*b* have respective upper surfaces covered with an insulating protective film 23. The insulating protective film 23 is, for example, an oxide film (such as a silicon oxide film (SiOx)). It should be noted that the insulating protective film 23 may be a nitride film (such as a silicon nitride film). The main electrodes 33*a* and 33*b* are covered with the insulating protective film 23, which in turn suppresses electrochemical reactions occurring at an interface between the electrode metal and the liquid to suppress deterioration and wear of the electrode metal over time.

A channel cover 25 is disposed on an upper surface of the insulating protective film 23. The channel cover 25 is made of PDMS (dimethylpolysiloxane), for example. The channel cover 25 has a lower surface with an elongated recessed channel groove 251. The width of the channel groove 251 is, for example, on a microscale. The channel groove 251 of the channel cover 25 and the upper surface of the insulating protective film 23 define the main channel 31 and an inspection channel 41 to be described later. In this manner, the channel cover 25 is mounted to the upper surface 211 of the substrate 2, whereby the main channel 31 is disposed on the upper surface 211 of the substrate 21. As shown in FIG. 1, the substrate 21 is wider than the channel cover 25.

As shown in FIG. 1, each of the main electrodes 33*a* and 33*b* includes a first pad portion 331 spaced apart from the main channel 31, and a plurality of first thin line portions 333 arranged in a comb tooth shape. At least part of the first pad portion 331 of each of the main electrodes 33*a* and 33*b* is disposed outside the channel cover 25. The first pad portion 331 of each of the main electrodes 33*a* and 33*b* is not covered with the insulating protective film 23. This enables the power supply parts 13 to be connected to the first pad portions 331 or enables the first pad portions 331 to be grounded outside the channel cover 25.

The first thin line portions 333 of the main electrodes 33*a* and 33*b* are arranged so as to vertically overlap the main channel 31. The first thin line portions 333 of the main electrodes 33*a* and 33*b* are portions that exert an electrical action on the objects to be collected in the liquid injected into the separation channel 311 of the main channel 31.

The first thin line portions 333 are in the shape of thin lines extending in a direction intersecting the separation channel 311 of the main channel 31. The first thin line portions 333 of the main electrodes 33*a* and 33*b* are arranged in equally spaced relation in a longitudinal direction of the separation channel 311. The first thin line portions 333 of the main electrode 33*a* and the first thin line portions 333 of the main electrodes 33*b* are spaced one from another and arranged alternately in the longitudinal direction of the separation channel 311. Specifically, 20 pairs of the first thin line portions 333 of the main electrode 33*a* and the main electrode 33*b* are arranged alternately at spacings of 50 μm in the longitudinal direction of the separation channel 311. It should be noted that the spacings at which the first thin line portions 333 are arranged and the number of pairs of first thin line portions 333 may be set arbitrarily.

Each of the first thin line portions 333 of the main electrodes 33*a* and 33*b* extends in a direction obliquely intersecting the separation channel 311 so as to form an acute angle, for example, in the range of 10° to 60° with respect to the longitudinal direction of the separation channel 311.

In using the dielectrophoresis device 1, a liquid containing the objects to be collected is supplied from the first supply part 315 to the main channel 31. Then, as shown in FIG. 1, the first pad portion 331 of the main electrode 33*a* is grounded, and a power supply part 13 is connected to the first pad portion 331 of the main electrode 33*b*. The power supply part 13 is configured with a function generator, for example. The power supply part 13 applies an AC voltage between the main electrodes 33*a* and 33*b* in accordance with the objects to be collected, based on the control of the controller 15. Specifically, the AC voltage in accordance with the objects to be collected is a voltage with a frequency that generates an electric field specifically exerting a dielectrophoretic force (attraction) on the objects to be collected, and with a magnitude to such a degree as not to destroy the objects to be collected.

When the voltage is applied between the main electrodes 33*a* and 33*b*, the objects to be collected in the liquid injected into the main channel 31 are collected into the collection channel 313*a* by flowing through the main channel 31 while being attracted to the first thin line portions 333 of the main electrodes 33*a* and 33*b*. On the other hand, the objects not to be collected on which no dielectrophoretic force is exerted or only a weak induced migration force is exerted are collected into the collection channel 313*b*.

The liquid reservoir 40 is capable of storing a liquid therein. As shown in FIG. 1, the liquid reservoir 40 includes the inspection channel 41. The liquid reservoir 40 and the inspection channel 41 are disposed on the insulating protective film 23 in the same manner as the main channel 31 shown in FIG. 2. As shown in FIG. 1, the inspection channel 41 has an elongated linear shape. The inspection channel 41 has a first end connected to a second supply part 411. The second supply part 411 has a second supply opening 412 for supplying a liquid to flow into the inspection channel 41. The inspection channel 41 has a second end connected to a second collection part 413. The second collection part 413 has a second collection opening 414 for collecting the liquid flowing through the inspection channel 41.

As shown in FIG. 1, the three pairs of inspection electrodes 43*a* and 43*b* are disposed on the same substrate 21 as the main electrodes 33*a* and 33*b*. The inspection electrodes 43*a* and 43*b* are disposed adjacent to the main electrodes 33*a* and 33*b*. The inspection electrodes 43*a* and 43*b* are disposed on the upper surface 211 of the substrate 21 in the same manner as the main electrodes 33*a* and 33*b* shown in FIG. 2. The inspection electrodes 43*a* and 43*b* are disposed between the upper surface 211 of the substrate 21 and the liquid reservoir 40. The inspection electrodes 43*a* and 43*b* are covered with the insulating protective film 23. This suppresses electrochemical reactions occurring at an interface between the electrode metal and the liquid in the inspection electrodes 43*a* and 43*b* to suppress deterioration and wear of the electrode metal over time.

As shown in FIG. 1, each of the inspection electrodes 43*a* and 43*b* includes a second pad portion 431 spaced apart from the main channel 31, and a plurality of second thin line portions 433 arranged in a comb tooth shape. As shown in FIG. 1, the second pad portion 431 is disposed outside the channel cover 25. The second pad portion 431 of each of the inspection electrodes 43*a* and 43*b* is not covered with the insulating protective film 23. This enables the power supply parts 13 to be connected to the second pad portions 431 or enables the second pad portions 431 to be grounded outside the channel cover 25.

The second thin line portions 433 of the inspection electrodes 43*a* and 43*b* are arranged so as to vertically overlap the inspection channel 41. The second thin line portions 433 of the inspection electrodes 43*a* and 43*b* are portions that exert an electrical action on the liquid in the inspection channel 41.

The second thin line portions 433 are in the shape of thin lines extending in a direction intersecting (in this embodiment, orthogonal to) the inspection channel 41. The second thin line portions 433 of the inspection electrodes 43*a* and 43*b* are arranged in equally spaced relation in a longitudinal direction of the inspection channel 41. The second thin line portions 433 of the inspection electrodes 43*a* and the second thin line portions 433 of the inspection electrodes 43*b* are spaced one from another and arranged alternately in the longitudinal direction of the inspection channel 41.

Portions (first overlapping portions 335) of the main electrodes 33*a* and 33*b* which overlap the main channel 31 are preferably equal in area to portions (second overlapping portions 435) of the inspection electrodes 43*a* and 43*b* which overlap the inspection channel 41. The spacings at which the inspection electrodes 43*a* and 43*b* are arranged and the number of pairs of inspection electrodes 43*a* and 43*b* are preferably set so that the area of the first overlapping portions 335 is equal to the area of the second overlapping portions 435.

Each of the second thin line portions 433 of the inspection electrodes 43*a* and 43*b* may extend in a direction obliquely intersecting the inspection channel 41 in the same manner as the first thin line portions 333 of the main electrodes 33*a* and 33*b*.

<Method of Manufacturing Channel Chip 11>

Subsequently, a method of manufacturing the channel chip 11 will be described. First, a film of electrode metal having a predetermined thickness (e.g., 100 nm) is deposited on the upper surface 211 of the substrate 21 by vacuum evaporation. Then, a predetermined pattern is formed on the film of electrode metal by photolithography and wet etching. This patterning forms the main electrodes 33*a* and 33*b* and the three pairs of inspection electrodes 43*a* and 43*b* on the upper surface 211 of the substrate 21. After the patterning of the electrodes, the insulating protective film 23 is formed. Specifically, a silicon oxide film (SiOx) that is the insulating protective film 23 having a predetermined thickness (e.g., 200 nm) is deposited on the upper surface 211 of the substrate 21 and on the upper surfaces of the electrodes (including the main electrodes 33*a* and 33*b* and the three pairs of inspection electrodes 43*a* and 43*b*) by sputtering.

After the insulating protective film 23 is formed, the first pad portion 331 of each of the main electrodes 33*a* and 33*b* and the second pad portion 431 of each of the inspection electrodes 43*a* and 43*b* are formed by photolithography and dry etching. Thereafter, the channel cover 25 is mounted to the substrate 21. Specifically, the channel cover 25 and the substrate 21 on which the electrodes are formed are plasma-treated and affixed together. The channel groove 251 corresponding to the main channel 31 and a channel groove corresponding to the liquid reservoir 40 (the inspection channel 41) are formed in the channel cover 25. Thus, the mounting of the channel cover 25 forms the main channel 31 and the liquid reservoir 40 on the substrate 21.

In the case of the channel chip 11, the main electrodes 33*a* and 33*b* corresponding to the main channel 31 and the inspection electrodes 43*a* and 43*b* corresponding to the liquid reservoir 40 are disposed on the same substrate 21. Thus, with the liquid received in the liquid reservoir 40, the inspection electrodes 43*a* and 43*b* are inspected for performance, whereby the performance of the main electrodes 33*a* and 33*b* for the main channel 31 is appropriately evaluated without using the main channel 31. This suppresses contamination of the main channel 31 and clogging of the main electrodes 33 in order to evaluate the performance of the main electrodes 33*a* and 33*b*.

In the channel chip 11, variations in manufacturing steps of the channel chip 11 (variations in the thickness or relative dielectric constant of the insulating protective film, and variations in the resistivity of the electrode metal) and the presence of defects such as surface organic contamination and electrode breakage are detected by inspecting the inspection electrodes 43*a* and 43*b*. For example, the percentage of good channel chips 11 to be provided to users is increased by inspecting the inspection electrodes 43*a* and 43*b* in the course of manufacture of the channel chips 11.

The inspection electrodes 43*a* and 43*b* overlap the inspection channel 41 of the liquid reservoir 40, whereby the conditions of the environment in which the inspection electrodes 43*a* and 43*b* are disposed are brought closer to the conditions of the environment in which the main electrodes 33*a* and 33*b* are disposed. Thus, the performance of the main electrodes 33*a* and 33*b* is appropriately evaluated based on the inspection results of the inspection electrodes 43*a* and 43*b*.

As shown in FIG. 1, the inspection electrodes 43*a* and 43*b* are disposed adjacent to the main electrodes 33*a* and 33*b*, so that the conditions of the environment in which the inspection electrodes 43*a* and 43*b* are disposed are brought closer to the conditions of the environment in which the main electrodes 33*a* and 33*b* are disposed. Thus, the performance of the main electrodes 33*a* and 33*b* is appropriately evaluated based on the inspection results of the inspection electrodes 43*a* and 43*b*.

If the cross-sectional shape and cross-sectional dimensions of the inspection channel 41 are the same as those of the separation channel 311 in the main channel 31, the cross-sectional dimensions between the electrodes including the liquid of the inspection electrodes 43*a* and 43*b* are the same as those between the main electrodes 33*a* and 33*b* covered with the separation channel 311. This allows the inspection electrodes 43*a* and 43*b* and the main electrodes 33*a* and 33*b* to have uniform resistance and capacitance components of the liquid which depend on the cross-sectional shape and cross-sectional dimensions of the channel immediately over the electrodes. Thus, the performance of the main electrodes 33*a* and 33*b* is appropriately evaluated based on the inspection results of the inspection electrodes 43*a* and 43*b*.

The main electrodes 33*a* and 33*b* and the inspection electrodes 43*a* and 43*b* are in a shortened and parallel comb tooth shape, whereby the low-resistance and uniform dielectrophoretic force is applied into the liquid.

The performance of the inspection electrodes 43*a* and 43*b* is the same as that of the main electrodes 33*a* and 33*b* because the area of the second overlapping portions 435 of the inspection electrodes 43*a* and 43*b* is equal to that of the first overlapping portions 335 of the main electrodes 33*a* and 33*b*. Thus, the performance of the main electrodes 33*a* and 33*b* for the main channel 31 is appropriately evaluated based on the inspection results of the inspection electrodes 43*a* and 43*b*.

It is not essential that the area of the first overlapping portions 335 is equal to the area of the second overlapping portions 435. Even if the area of the first overlapping portions 335 is different from the area of the second overlapping portions 435, the main electrodes 33*a* and 33*b* are relatively evaluated from the inspection results of the inspection electrodes 43*a* and 43*b* in accordance with the difference in area.

The channel chip 11 includes the plurality of pairs of inspection electrodes 43*a* and 43*b*. Thus, even if in-plane variations occur in the manufacturing steps within the same channel chip 11, the performance of the main electrodes 33*a* and 33*b* is appropriately evaluated by averaging the measurement results of the plurality of pairs of inspection electrodes 43*a* and 43*b*. Also, the provision of the three pairs of inspection electrodes 43*a* and 43*b* ensures the minimum number of samples required to obtain an average error and suppresses an increase in size of the channel chip 11.

In the example shown in FIG. 1, the channel chip 11 includes the three pairs of inspection electrodes 43*a* and 43*b*. However, the channel chip 11 may include only two pairs of inspection electrodes 43*a* and 43*b* or not less than four pairs of inspection electrodes 43*a* and 43*b*. It is not essential that the channel chip 11 includes the plurality of pairs of inspection electrodes 43*a* and 43*b*. The channel chip 11 may include only one pair of inspection electrodes 43*a* and 43*b*.

When the channel chip 11 includes only one pair of inspection electrodes 43*a* and 43*b*, the size of the channel chip 11 is reduced.

It is desirable that the three pairs of inspection electrodes 43*a* and 43*b* are as close as possible to the main electrodes 33*a* and 33*b*. This allows the performance of the main electrodes 33*a* and 33*b* to be appropriately evaluated based on the inspection results of the inspection electrodes 43*a* and 43*b*.

A correction value for correction of manufacturing variations is obtained based on the inspection results of the inspection electrodes 43*a* and 43*b*. Then, the controller 15 may control the power supply parts 13 so that the power supply parts 13 apply a voltage between the main electrodes 33*a* and 33*b* in accordance with the obtained correction value. This allows a stable induced migration force to be imparted to the objects to be collected in the liquid injected into the main channel 31.

2. Second Embodiment

Next, a second embodiment will be described. In the following description, components having the same functions as those described above are designated by like reference numerals and characters or like reference numerals and characters with alphabetic characters appended thereto, and will not be described in detail in some cases.

Figure 3:
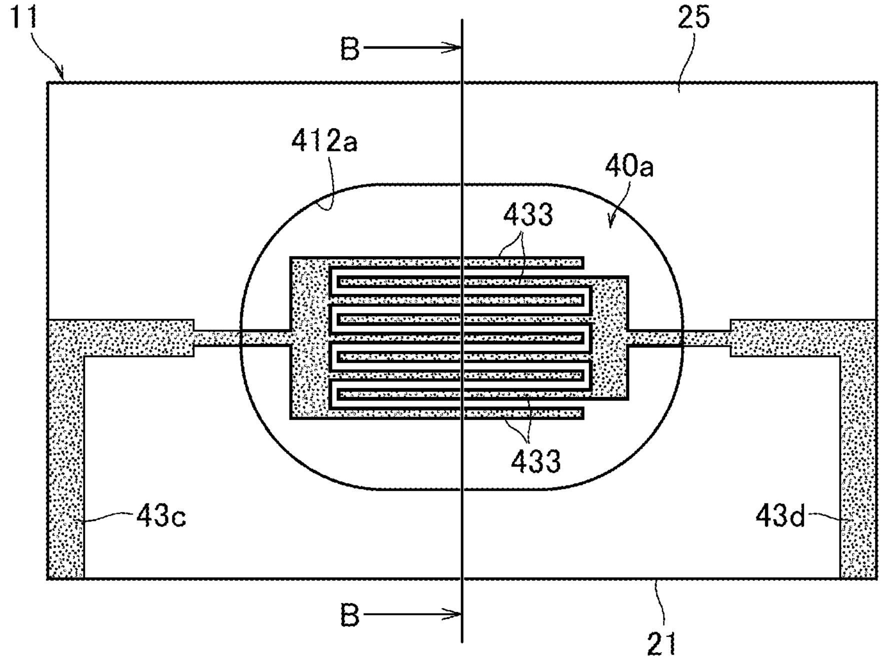
FIG. 3 is a plan view showing part of the channel chip according to a second embodiment.
Figure 4:
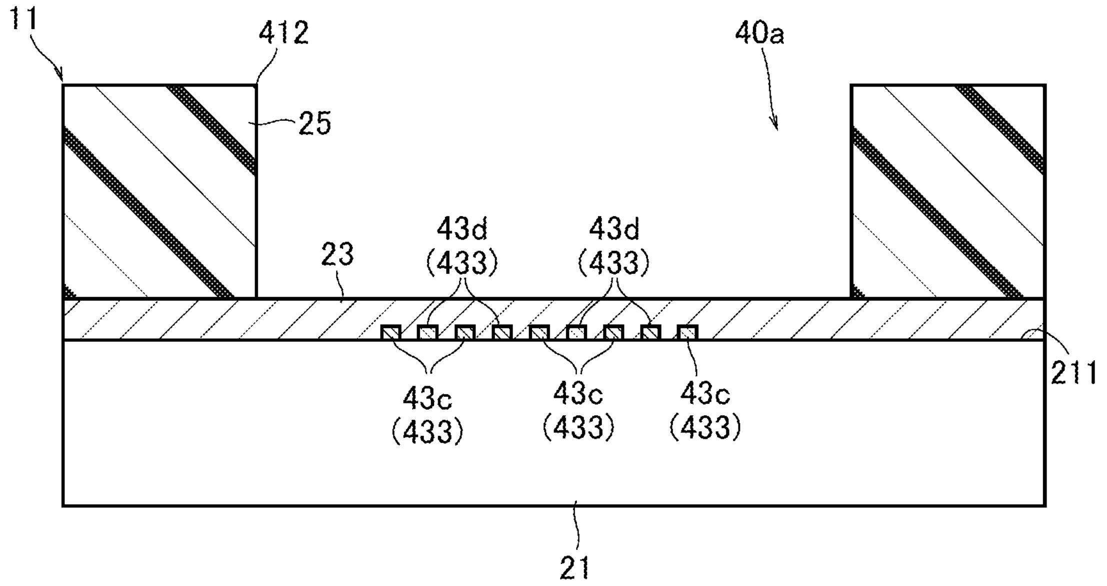
FIG. 4 is a schematic sectional view of the channel chip taken along a line B-B shown in FIG. 3.

FIG. 3 is a plan view showing part of the channel chip 11 according to the second embodiment. FIG. 4 is a schematic sectional view of the channel chip 11 taken along a line B-B shown in FIG. 3. FIGS. 3 and 4 show only a liquid reservoir 40*a* and its surroundings in the channel chip 11.

As shown in FIGS. 3 and 4, the channel chip 11 may include the liquid reservoir 40*a* in place of or in addition to the liquid reservoir 40 shown in FIG. 1. The liquid reservoir 40*a* is capable of storing a liquid therein. As shown in FIG. 4, the liquid reservoir 40*a* is configured with a through hole provided in the channel cover 25. The channel cover 25 has an opening 412*a* for injecting the liquid therethrough into the liquid reservoir 40*a*. The liquid reservoir 40*a* is configured as a recessed hole with an upper opening, rather than as an elongated tubular channel surrounded by walls on all sides like the inspection channel 41 shown in FIG. 1 or 2.

As shown in FIGS. 3 and 4, the channel chip 11 includes a pair of inspection electrodes 43*c* and 43*d*. Each of the inspection electrodes 43*c* and 43*d* includes a plurality of second thin line portions 433 arranged in a comb tooth shape. The second thin line portions 433 of the inspection electrodes 43*c* and 43*d* are arranged in equally spaced relation in the same manner as the second thin line portions 433 of the inspection electrodes 43*a* and 43*b*. The second thin line portions 433 are disposed between the liquid reservoir 40*a* and the substrate 21. The second thin line portions 433 are arranged so as to vertically overlap the liquid reservoir 40*a*.

In the case of the channel chip 11 according to the second embodiment, with the liquid injected into the liquid reservoir 40*a*, the inspection electrodes 43*c* and 43*d* are inspected for performance, whereby the performance of the main electrodes 33*a* and 33*b* is appropriately evaluated. Thus, the advance evaluation of the performance of the main electrodes 33*a* and 33*b* is made without using the main channel 31.

The second overlapping portions 435 of the inspection electrodes 43*c* and 43*d* which vertically overlap the liquid reservoir 40*a* may be equal in area to the first overlapping portions 335 of the main electrodes 33*a* and 33*b*. Thus, the performance of the main electrodes 33*a* and 33*b* is appropriately evaluated from the inspection results of the inspection electrodes 43*c* and 43*d*. In this case, the inspection results of the inspection electrodes 43*c* and 43*d* may be corrected in accordance with liquid resistance or capacitance components dependent on the cross-sectional area of the channel immediately over the inspection electrodes 43*c* and 43*d*.

3. Modifications

While the embodiments have been described hereinabove, the present invention is not limited to the aforementioned embodiments, but various modifications may be made.

For example, the channel chip 11 may include a plurality of main channels 31 on the single substrate 21. Alternatively, the channel chip 11 may include a plurality of pairs of main electrodes 33*a* and 33*b* on the single substrate 21.

The channel chip 11 may include a plurality of liquid reservoirs 40 (or liquid reservoirs 40*a*) on the single substrate 21. Also, the channel chip 11 may include the inspection electrodes 43*a* and 43*b* (or the inspection electrodes 43*c* and 43*d*) corresponding to each of the liquid reservoirs 40 (or the liquid reservoirs 40*a*).

The shape of the electrode portions in the main electrodes 33*a* and 33*b* which exert an electrical action on the main channel 31 is not limited to the comb tooth shape shown in FIG. 1, but may be changed as desired. Likewise, the shape of the inspection electrodes 43*a* and 43*b* and the inspection electrodes 43*c* and 43*d* is not limited to the comb tooth shape, but may be changed as desired.

While the invention has been described in detail, the foregoing description is in all aspects illustrative, and the invention is not limited thereto. It is therefore understood that numerous modifications and variations not illustrated can be devised without departing from the scope of the invention. The components described in the aforementioned embodiments and in the various modifications may be combined together or dispensed with, as appropriate, unless the components are inconsistent with each other.

REFERENCE SIGNS LIST

1 Dielectrophoresis device
11 Channel chip
21 Substrate
23 Insulating protective film
31 Main channel
33*a*, 33*b* Main electrodes
40, 40*a* Liquid reservoirs
41 Inspection channel
43*a*, 43*b* Inspection electrodes
43*c*, 43*d* Inspection electrodes
211 Upper surface (main surface)
335 First overlapping portions
412*a* Opening
435 Second overlapping portions

The invention claimed is:

1. A channel chip comprising:
- a substrate;
- a main channel disposed on one main surface of said substrate and capable of receiving a liquid therein, wherein the main channel is configured for dielectrophoresis using a dielectrophoretic force;
- a liquid reservoir disposed on said main surface of said substrate in spaced apart relation to said main channel and capable of receiving a liquid therein, wherein the shape of said liquid reservoir is different from the shape of said channel;

a pair of main electrodes disposed between said main surface of said substrate and said main channel; and at least one pair of inspection electrodes disposed between said main surface of said substrate and said liquid reservoir, wherein said pair of inspection electrodes is disposed apart from said main channel and is configured to evaluate the performance of said pair of main electrodes.

2. The channel chip according to claim 1, wherein said liquid reservoir includes an inspection channel for evaluating the performance of said pair of main electrode capable of passing a liquid therethrough, and wherein said pair of inspection electrodes are disposed between said main surface of said substrate and said inspection channel.

3. The channel chip according to claim 1, wherein a first overlapping portion of said pair of main electrodes which overlaps said main channel is equal in area to a second overlapping portion of said pair of inspection electrodes which overlaps said liquid reservoir.

4. The channel chip according to claim 1, wherein said at least one pair of inspection electrodes include not less than two pairs of inspection electrodes.

5. The channel chip according to claim 4, wherein said at least one pair of inspection electrodes include three pairs of inspection electrodes.

6. The channel chip according to claim 1, wherein said pair of main electrodes and said pair of inspection electrodes are disposed adjacent to each other.

7. The channel chip according to claim 1, wherein said pair of main electrodes and said pair of inspection electrodes have respective surfaces covered with an insulating protective film, and wherein said main channel and said liquid reservoir are disposed on said insulating protective film.

8. The channel chip according to claim 1, wherein said pair of main electrodes and said pair of inspection electrodes have a comb tooth shape.

9. A dielectrophoresis device comprising:

a channel chip as recited in claim 1; and a power supply part for applying a voltage to said pair of main electrodes and said pair of inspection electrodes.

* * * * *